(12) United States Patent
Gauss et al.

(10) Patent No.: US 11,149,883 B2
(45) Date of Patent: Oct. 19, 2021

(54) FLUID COUPLINGS, SYSTEMS, AND METHODS

(71) Applicant: Eaton Corporation, Cleveland, OH (US)

(72) Inventors: Jason C. Gauss, Jackson, MI (US); Gregory Kiernan, Grass Lake, MI (US); Christopher T. Cantrell, Jackson, MI (US); Devashish Murkya, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 785 days.

(21) Appl. No.: 15/790,629

(22) Filed: Oct. 23, 2017

(65) Prior Publication Data

US 2018/0080587 A1     Mar. 22, 2018

Related U.S. Application Data

(63) Continuation-in-part of application No. 15/631,692, filed on Jun. 23, 2017, now Pat. No. 10,883,640.
(Continued)

(51) Int. Cl.
*F16L 21/08*     (2006.01)
*B29C 70/88*     (2006.01)
*F16B 39/08*     (2006.01)
*F16L 21/03*     (2006.01)
*F16B 1/00*      (2006.01)
(Continued)

(52) U.S. Cl.
CPC ............ *F16L 21/08* (2013.01); *B29C 70/882* (2013.01); *F16B 1/0071* (2013.01); *F16B 39/08* (2013.01); *F16L 21/03* (2013.01); *B21C 37/28* (2013.01); *F16B 31/02* (2013.01); *F16L 19/005* (2013.01); *F16L 21/002* (2013.01)

(58) Field of Classification Search
CPC ......... F16L 21/08; F16L 21/03; F16L 19/005; F16B 1/0071; F16B 39/08; B29C 70/882
See application file for complete search history.

(56) References Cited

U.S. PATENT DOCUMENTS 4,244,608 A     1/1981  Stuemky
5,058,930 A *  10/1991  Schlosser .............. F16L 19/005
                                                           285/92
(Continued)

FOREIGN PATENT DOCUMENTS

CN     102207017 B     3/2013
CN     102192380 B     11/2013
(Continued)

*Primary Examiner* — David Bochna
*Assistant Examiner* — James A Linford
(74) *Attorney, Agent, or Firm* — Fishman Stewart PLLC

(57) ABSTRACT

A coupling includes a male adapter and a female adapter, and may include a nut and a sleeve. In embodiments, the male adapter includes a male adapter inner diameter, and may include threads. A method of operating a fluid coupling may include providing a first member, a second member, a nut, and a sleeve, connecting the sleeve with the nut such that rotation of the sleeve causes rotation of the nut, rotating the sleeve to connect the first member with the second member, engaging an inner ratchet profile of the sleeve with a ratchet profile of a shoulder of the first member, and covering the shoulder of the first member, including the ratchet profile, with the sleeve.

15 Claims, 15 Drawing Sheets

Related U.S. Application Data

(60) Provisional application No. 62/540,791, filed on Aug. 3, 2017, provisional application No. 62/467,966, filed on Mar. 7, 2017, provisional application No. 62/411,964, filed on Oct. 24, 2016, provisional application No. 62/354,459, filed on Jun. 24, 2016.

(51) Int. Cl.
  *F16L 21/00* (2006.01)
  *B21C 37/28* (2006.01)
  *F16L 19/00* (2006.01)
  *F16B 31/02* (2006.01)

(56) References Cited

U.S. PATENT DOCUMENTS

| | | | |
|---|---|---|---|
| 5,127,679 A * | 7/1992 | Pouplier | F16L 19/005 285/86 |
| 5,188,398 A * | 2/1993 | Parimore, Jr. | F16L 19/005 285/39 |
| 5,215,336 A * | 6/1993 | Worthing | F16L 19/005 285/319 |
| 5,851,035 A * | 12/1998 | Marc | F16L 19/005 285/86 |
| 7,156,424 B2 | 1/2007 | McCord | |
| 7,552,947 B2 | 6/2009 | Ryhman | |
| 8,038,181 B2 | 10/2011 | Marschall et al. | |
| 8,394,472 B2 | 3/2013 | Kertesz | |
| 8,888,140 B2 | 11/2014 | Stroempl et al. | |
| 9,103,479 B2 | 8/2015 | Kertesz et al. | |
| D738,470 S | 9/2015 | Eaton et al. | |
| 9,175,794 B2 | 11/2015 | Lewcun | |
| 9,366,370 B2 | 6/2016 | Courpet et al. | |
| 9,506,587 B2 | 11/2016 | Petit | |
| D777,299 S | 1/2017 | Eaton et al. | |
| 9,611,959 B2 | 4/2017 | Hartmann et al. | |
| 9,714,732 B2 | 7/2017 | Neiske | |
| 2007/0267869 A1 * | 11/2007 | Patel | F16L 19/0225 285/386 |
| 2010/0140920 A1 | 6/2010 | Kloss et al. | |
| 2010/0225108 A1 | 9/2010 | Mann | |
| 2010/0225109 A1 | 9/2010 | Swift et al. | |
| 2013/0056978 A1 | 3/2013 | Swift et al. | |
| 2013/0072048 A1 * | 3/2013 | Schafer | H01R 13/622 439/372 |
| 2013/0161941 A1 | 6/2013 | Zulauf et al. | |
| 2013/0257046 A1 | 10/2013 | Henrich et al. | |
| 2014/0069621 A1 | 3/2014 | Mann et al. | |
| 2015/0000096 A1 | 1/2015 | Gilbreath | |
| 2015/0176732 A1 | 6/2015 | Courpet et al. | |
| 2015/0184781 A1 | 7/2015 | Sanchez et al. | |
| 2015/0198278 A1 | 7/2015 | Clements et al. | |
| 2015/0211668 A1 | 7/2015 | Campbell et al. | |
| 2015/0240687 A1 | 8/2015 | Mann | |
| 2015/0240693 A1 | 8/2015 | Birman et al. | |
| 2016/0069504 A1 | 3/2016 | Wollaston et al. | |
| 2016/0091126 A1 | 3/2016 | Gibson et al. | |
| 2016/0281887 A1 | 9/2016 | Dobmeier et al. | |
| 2016/0334040 A1 | 11/2016 | Ehrke et al. | |
| 2017/0040717 A1 | 2/2017 | Le Quere | |
| 2017/0268706 A1 | 9/2017 | Schippers et al. | |

FOREIGN PATENT DOCUMENTS

| | | |
|---|---|---|
| DE | 102008049959 B4 | 1/2013 |
| DE | 102008048040 B4 | 3/2013 |
| DE | 102009011864 B4 | 7/2013 |
| DE | 102005049271 B4 | 10/2016 |
| EP | 1681504 B1 | 2/2013 |
| EP | 1829663 B1 | 5/2013 |
| EP | 2439439 B1 | 9/2013 |
| EP | 2106515 B1 | 4/2014 |
| EP | 2510271 B1 | 5/2014 |
| EP | 2837868 A1 | 2/2015 |
| EP | 2860387 A1 | 4/2015 |
| EP | 2873899 A1 | 5/2015 |
| EP | 2479469 B1 | 6/2016 |
| EP | 3124848 A1 | 2/2017 |
| FR | 2973094 B3 | 3/2013 |
| WO | WO-2015181235 A1 | 12/2015 |
| WO | WO-2016023798 A1 | 2/2016 |
| WO | WO-2017008923 A1 | 1/2017 |

* cited by examiner

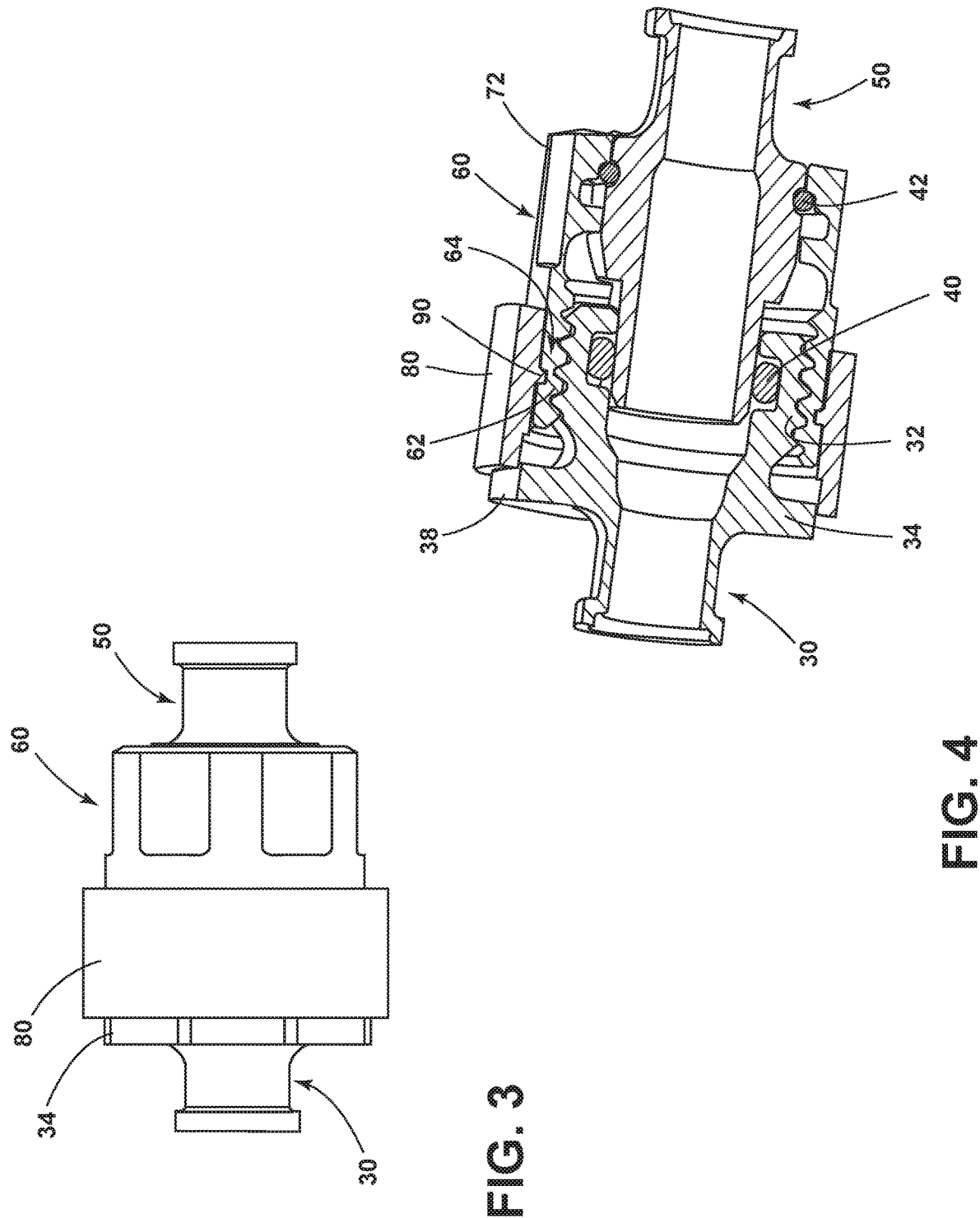

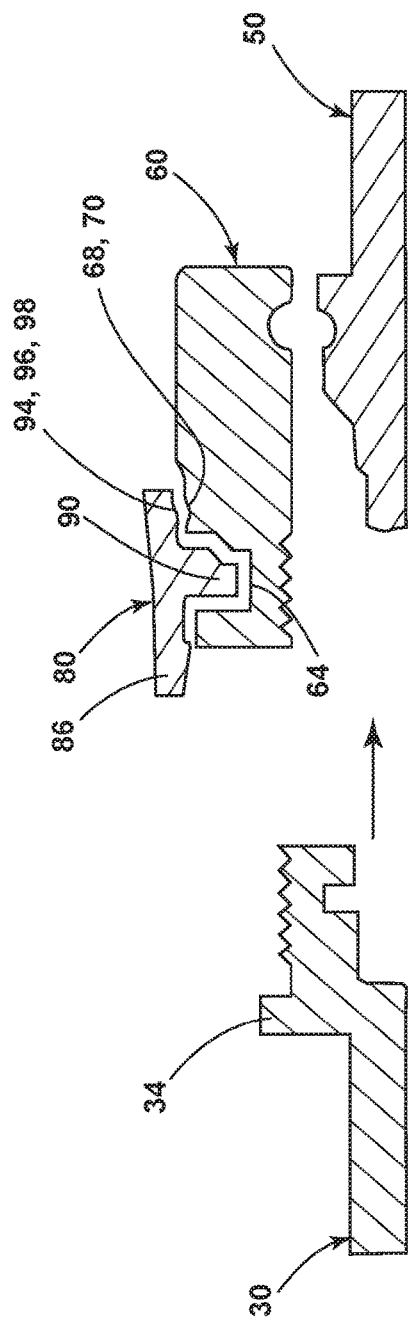
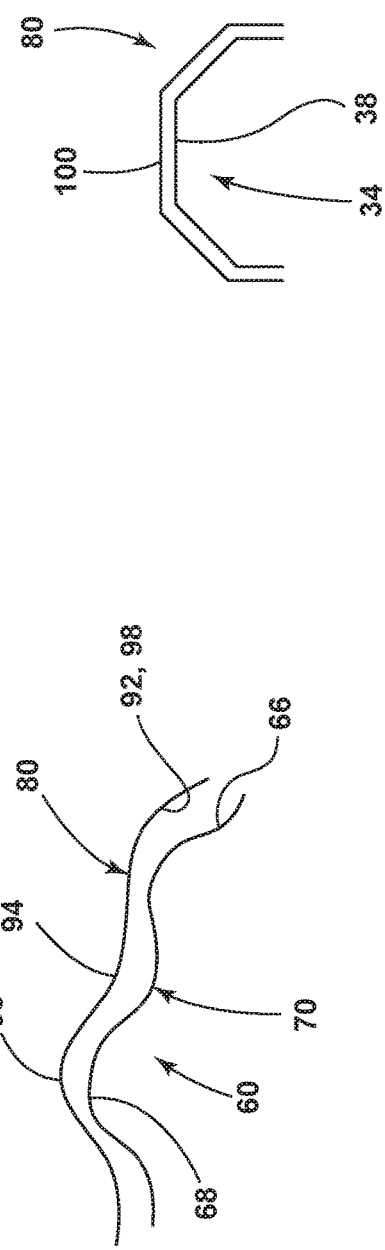
FIG. 8
FIG. 8A
FIG. 8B

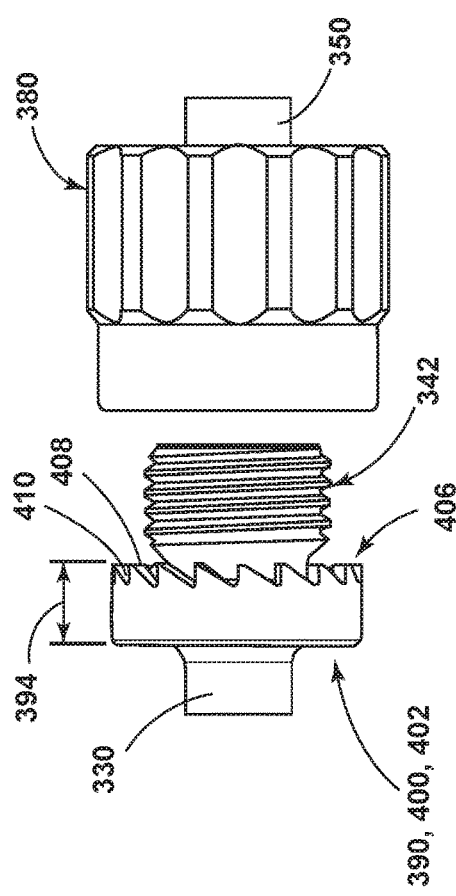
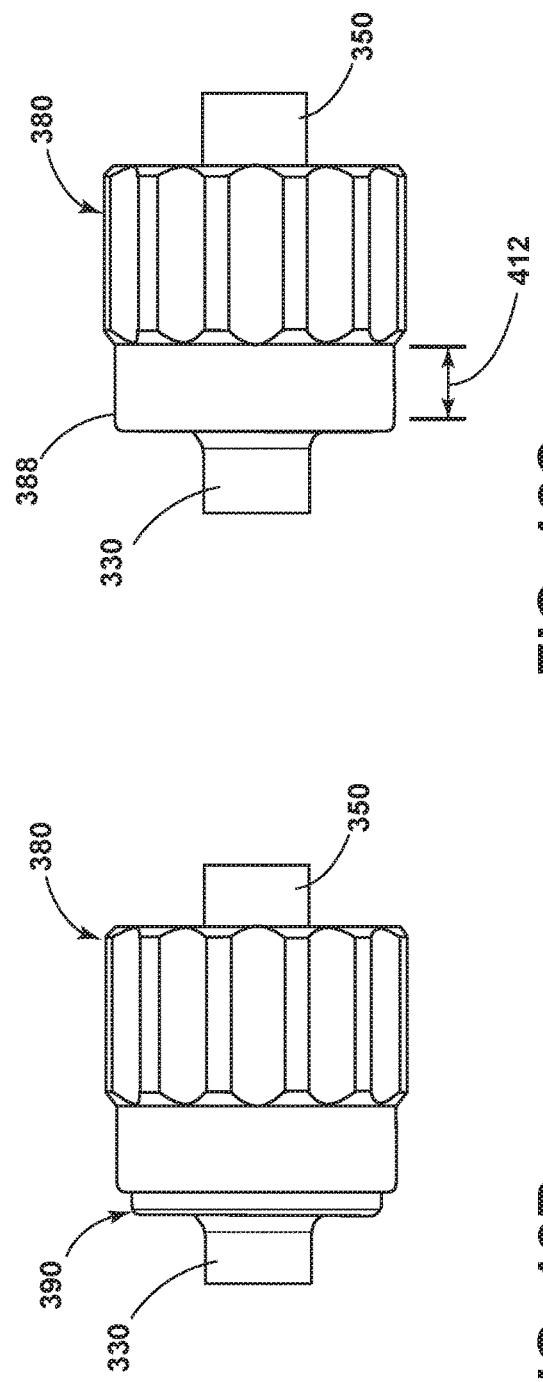
FIG. 12A
FIG. 12B
FIG. 12C

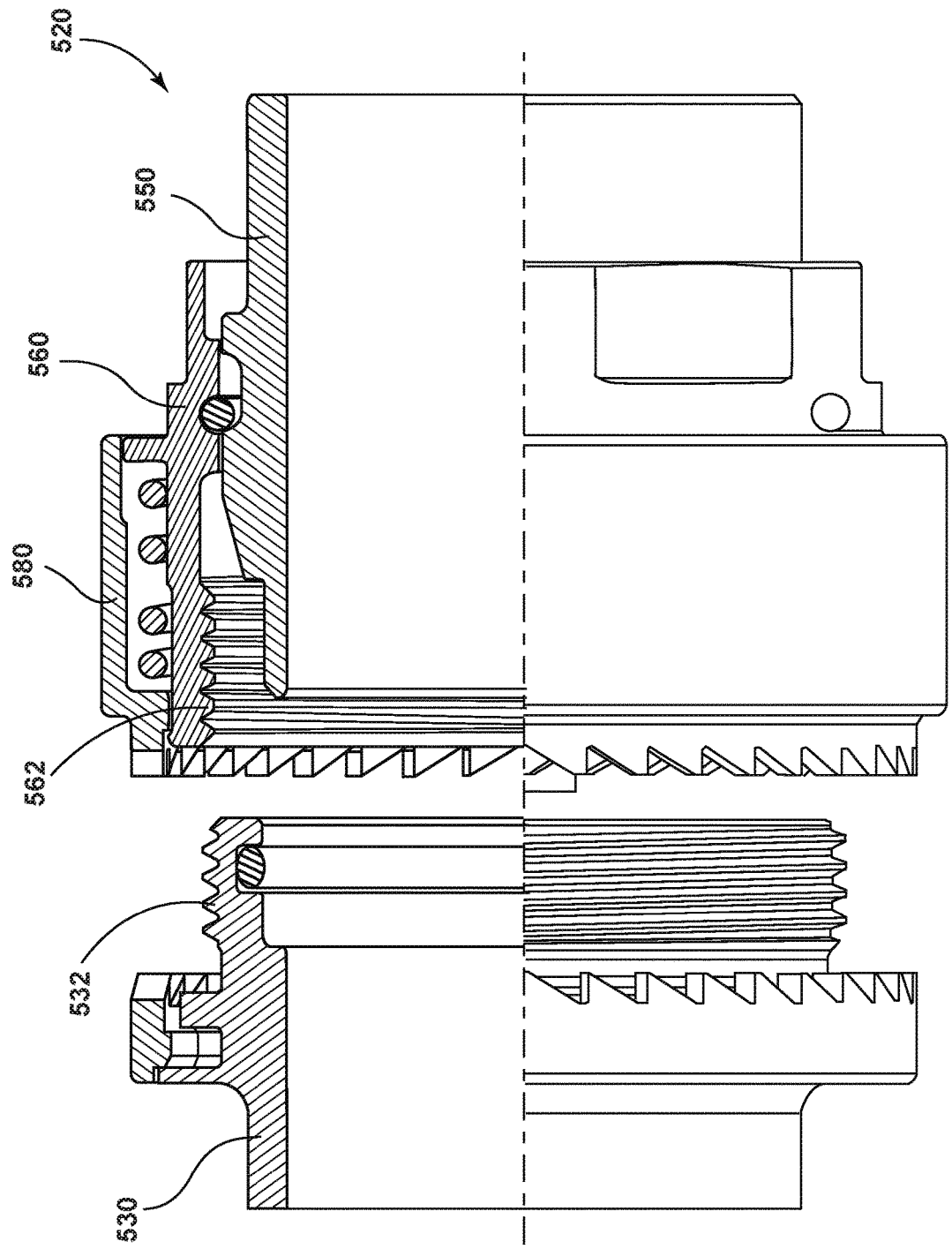

FLUID COUPLINGS, SYSTEMS, AND METHODS

CROSS-REFERENCE TO RELATED APPLICATION

This application is a continuation-in-part of U.S. patent application Ser. No. 15/631,692, filed Jun. 23, 2017, which claims the benefit of U.S. Provisional Patent Application Ser. No. 62/467,966, filed on Mar. 7, 2017, and U.S. Provisional Patent Application Ser. No. 62/354,459, filed on Jun. 24, 2016. This application claims the benefit of U.S. Provisional Patent Application Ser. No. 62/411,964, filed on Oct. 24, 2016, and U.S. Provisional Patent Application Ser. No. 62/540,791, filed on Aug. 3, 2017. The disclosures of each of the above are hereby incorporated herein by reference in their entireties.

TECHNICAL FIELD

The present disclosure relates generally to fluid conveyance fittings and couplings, including systems and methods involving fluid conveyance fittings and couplings.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Fluid couplings may provide fluid communication between two fluid conduits and it may be desirable to provide a visual indication to a user of a coupling that the coupling is sufficiently connected (e.g., to prevent leaks, unintended disconnection, etc.).

Fluid conveyance fittings/couplings, for example those used in aerospace applications, commonly have low conductivity requirements—e.g., approximately 10 milliohms. Conventional fittings that meet such requirements typically contain metal-to-metal seals that require significant installation force to function as intended. Challenges can arise when a fitting is designed for an application that requires low enough force to be connected by hand—i.e., without tooling. Contact force is commonly a significant factor in the conductivity for an interface, so without a significant input force during installation, meeting conductivity requirements can be challenging. Moreover, such fittings may be required to fully function as intended along a specified axial range of travel.

Examples of some fitting/coupling assemblies are generally described in U.S. Pat. No. 5,553,895, U.S. Pat. No. 5,570,910, U.S. Pat. No. 6,494,494, U.S. Pat. No. 6,592,151, and/or PCT Application PCT/US2016/043642, each of which is assigned to the assignee hereof and each of which is hereby incorporated by reference in its entirety as though fully set forth herein. Certain conventional fitting/coupling assemblies may be relatively large, heavy, difficult to assemble, and/or difficult to operate.

Among other things, it can be challenging to provide couplings/fittings and fitting systems that address one or more of the aforementioned challenges, such as allowing sufficient axial travel, maintaining adequate conductivity throughout that travel, providing an indication of sufficient connection, and/or providing fittings or couplings that are compact, lightweight, and/or easy to assembly and operate.

SUMMARY

In embodiments, a fluid coupling may include a first member that may be configured for connection with a first fluid conduit and may include a shoulder, a second member, which may be configured for connection with a second fluid conduit, a nut, and/or a sleeve that may be engaged with the nut and configured to cover the shoulder upon a sufficient connection of the first member with the second member. The sleeve may include an inner ratchet profile that may correspond to a ratchet profile of the shoulder.

With embodiments, a method of operating a fluid coupling may include providing a first member, a second member, a nut, and a sleeve; connecting the sleeve with the nut such that rotation of the sleeve causes rotation of the nut; rotating the sleeve to connect the first member with the second member, engaging an inner ratchet profile of the sleeve with a ratchet profile of a shoulder of the first member; and/or covering the shoulder of the first member, including the ratchet profile, with the sleeve.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

The present disclosure will now be described, by way of example, with reference to the accompanying drawings, wherein like reference numerals may identify like components in the several figures.

FIG. 3 is a side view generally illustrating portions of an embodiment of a partially connected coupling, in accordance with teachings of the present disclosure.

FIG. 4 is a cross-sectional perspective view generally illustrating portions of an embodiment of a partially connected coupling, in accordance with teachings of the present disclosure.

FIG. 8 is a cross-sectional view generally illustrating portions of an embodiment of a connected coupling, in accordance with teachings of the present disclosure.

FIG. 8A is a cross-sectional view generally illustrating portions of embodiments of a sleeve and a nut, in accordance with teachings of the present disclosure.

FIG. 8B is a cross-sectional view generally illustrating portions of embodiments of a sleeve and a shoulder, in accordance with teachings of the present disclosure.

FIG. 12A is a side view generally illustrating portions of an embodiment of an unconnected coupling, in accordance with teachings of the present disclosure.

FIG. 12B is a side view generally illustrating portions of an embodiment of a partially connected coupling, in accordance with teachings of the present disclosure.

FIG. 12C is a cross-sectional perspective view generally illustrating portions of an embodiment of an unconnected coupling, in accordance with teachings of the present disclosure.

FIG. 17 is a partial cross-sectional side view of an embodiment of a coupling, generally shown in a disconnected configuration.

DETAILED DESCRIPTION

Figures 1, 2:
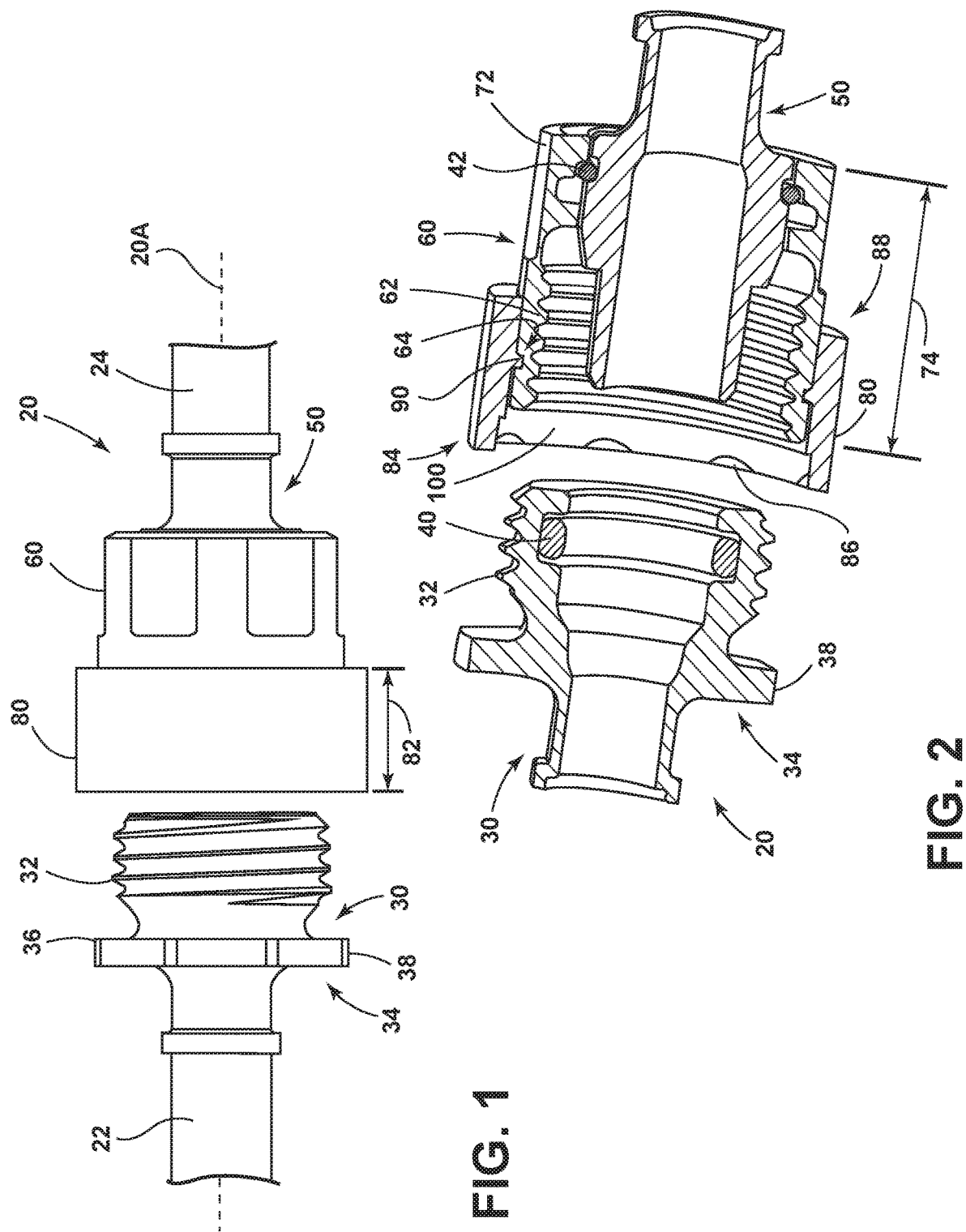
FIG. 1 is a side view generally illustrating portions of an embodiment of an unconnected coupling, in accordance with teachings of the present disclosure.
FIG. 2 is a cross-sectional perspective view generally illustrating portions of an embodiment of an unconnected coupling, in accordance with teachings of the present disclosure.

Reference will now be made in detail to embodiments of the present disclosure, examples of which are described herein and illustrated in the accompanying drawings. While the disclosed concepts will be described in conjunction with embodiments, it will be understood that they are not intended to limit the disclosure to these embodiments. On the contrary, the disclosure is intended to cover alternatives, modifications, and equivalents.

Referring now to the drawings, FIGS. 1, 2, 3, 4, 5, 6, 7, 8, 8A, and 8B generally illustrate embodiments of couplings or fitting systems 20 (or "fitting assemblies" or "assemblies") that may be used, for example, with fluids. A coupling 20 may include a first member 30 (e.g., a male adapter), a second member 50 (e.g., a female adapter), a nut 60, and/or a sleeve 80. The coupling 20 may or may not include a ratchet ring and/or a sleeve spring. For example and without limitation, the first member 30, the second member 50, the nut 60, and/or the sleeve 80 may not be connected with a ratchet ring and/or a sleeve spring. A coupling 20 may include a longitudinal axis 20A. Coupling 20 may be configured for connecting a first fluid conduit 22 with a second fluid conduit 24. The first member 30 may be configured for connection with the first fluid conduit 22 and the second member 50 may be configured for connection with the second fluid conduit 24. A fluid conduit 22, 24 may include, for example and without limitation, a pipe, a tube, a reservoir, and/or a fluid conveyance or storage device.

With embodiments, the first member 30 may include threads 32 (e.g., external threads) that may be configured to engage threads 62 (e.g., internal threads) of the nut 60. The nut 60, the sleeve 80, and/or the second member 50 may be rotatably connected to each other. The sleeve 80 may include a relatively short axial length 82 compared to other designs, which may reduce a combined volume of the nut 60 and the sleeve 80. The axial length 82 of the sleeve 80 may be less than the axial length 74 of the nut 60. For example and without limitation, an axial length 82 of a sleeve 80 may be at least 40% less than an axial length 74 of the nut 60. The sleeve 80 may be configured to engage a mating profile of the first member 30 (e.g., a shoulder 34), such as during installation. A coupling 20 may include a sealing member 40 that may provide a fluid seal between the first member 30 and the second member 50. A coupling 20 may include a drive wire 42 that may connect the nut 60 with the second member 50.

In embodiments, the first member 30 may include a shoulder 34 that may act as a visual indicator. For example, and without limitation, upon achieving a complete connection, the shoulder 34 may not be visible and/or may be at least partially obscured (e.g., by axial movement of the sleeve 80 over/around the shoulder 34). If the shoulder 34 is visible (e.g., from a transverse or radial direction relative to axis 20A), the shoulder 34 may serve as an indication that connection is not complete. The shoulder 34 may include one or more features at its outer diameter/radial surface 38 that may make it more noticeable/visible when a connection is not complete. For example, and without limitation, the shoulder 34 may include certain coloring (e.g. red, yellow, etc.), coatings, materials, components, and/or other features, such as an O-ring indicator that may be different from and/or distinguish the shoulder 34 from other portions of the coupling 20.

With embodiments, during a connection or assembly process, a first/forward end 84 of the sleeve 80 may mate with the shoulder 34 of the first member 30. At least one of the sleeve 80 and the shoulder 34 may include a tapered portion or edge (e.g., tapered portions 36, 86) that may facilitate engagement between the sleeve 80 and the shoulder 34 (e.g., the sleeve 80 sliding over the shoulder 34). A second/aft end 88 of the sleeve 80 may be connected with and/or permitted to rotate, at least to some degree, relative to the nut 60. For example and without limitation, the sleeve 80 may be keyed with the nut 60, such as via a radially-extending circumferential flange 90 of the sleeve 80 engaged with a circumferential groove 64 of the nut 60. The flange 90 may be able to rotate/slide within the groove 64, but the groove 64 may restrict axial movement of the flange 90 and the sleeve 80 relative to each other. A minimum rotational force to rotate the nut 60 may be bounded by a spline or sprocket feature of the nut 60 and the sleeve 80 (see, e.g., FIG. 8A). For example and without limitation, sleeve 80 may include an internal spline 92 (e.g., at or about sleeve aft end 88) that may correspond to an external spline 66 of the nut 60. A profile of the spline(s) 66, 92 may be configured to ensure that anti-rotation of the nut 60 will not occur inadvertently during use. A spline profile may include, for example, a series of alternating curved protrusions 68, 94 and curved recesses 70, 96 disposed about a circumference of the sleeve 80 (e.g., at a sleeve inner surface 98) and/or the nut 60 (e.g., at a nut outer surface 72).

With embodiments, the sleeve 80 may be configured to completely/fully cover the shoulder 34, at least in a radial direction (e.g., have a sufficiently long axial length 82), if the nut 60 is completely connected with/threaded onto the first member 30 (e.g., bottoms out) and/or a connection between the first member 30 and the second member 50 is complete.

In embodiments, an axial length 82 of the sleeve 80 may be sufficiently long such that upon a complete connection of the first member 30 and the second member 50, the sleeve 80 may extend axially beyond the shoulder 34. The sleeve 80 may include an inner diameter 100 with a shape that may correspond with (e.g., be configured to engage) a shape of an outer diameter 38 of the shoulder 34. For example, and without limitation, the sleeve 80 may include a polygonal (e.g., octagonal) inner diameter/surface 100 that may be configured to engage a polygonal (e.g., octagonal) outer diameter/surface 38 of the shoulder 34 (see, e.g., FIG. 8B).

In embodiments, during a connection or assembly process, the forward end 84 of the sleeve 80 may initially contact the shoulder 34 of the first member 30 in a manner/position in which the sleeve 80 and the shoulder 34 are not aligned (e.g., octagonal profiles are not aligned). A snap-fit type of engagement between the sleeve 80 and the nut 60 may be configured (e.g., enlarged, angled, tapered, etc.) to allow at least some axial play/flexibility of the sleeve 80 (e.g., away from the shoulder 34) until the sleeve 80 is aligned with the shoulder 34 (see, e.g., FIG. 8).

In embodiments, the shoulder 34 of the first member 30 may include a spline profile/feature that may correspond to a spline profile/feature of the forward end 84 of the sleeve 80 (e.g., in a similar manner described in connection with spline 66). In such configurations, relative motion between the sleeve 80 and the first member 30 may be limited and/or prevented. A splined interaction/engagement between the shoulder 34 and the sleeve 80 may control a minimum torque to prevent accidental loosening of the nut 60.

Figure 6:
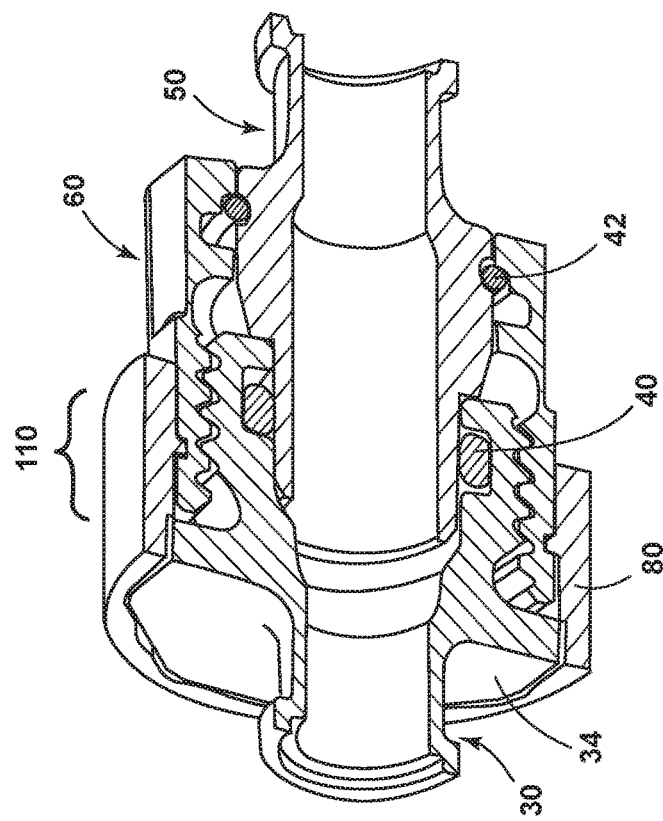
FIG. 6 is a cross-sectional perspective view generally illustrating portions of an embodiment of a connected coupling, in accordance with teachings of the present disclosure.
Figure 5:
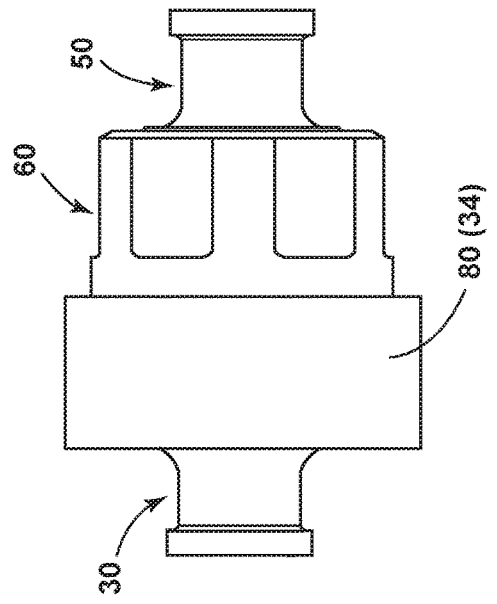
FIG. 5 is a side view generally illustrating portions of an embodiment of a connected coupling, in accordance with teachings of the present disclosure.
Figure 7:
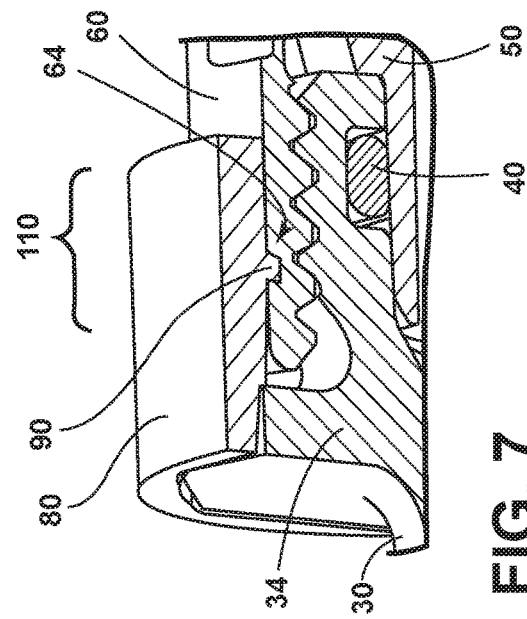
FIG. 7 is a cross-sectional perspective view generally illustrating portions of an embodiment of a connected coupling, in accordance with teachings of the present disclosure.

With embodiments, such as generally illustrated in FIGS. 6 and 7, a coupling 20 may include, in an assembled/connected configuration, an overlapping section 110 in which some or all of the first member 30, the second member 50, the nut 60, and the sleeve 80 overlap (e.g., in a radial direction).

In embodiments, a method of assembling a coupling 20 may include providing a first member 30 and a second member 50. A sleeve 80 and a nut 60 may be connected with the second member 50. The nut 60 may include internal threads 62 that may be configured to engage external threads 32 of the first member 30. The nut 60 and the first member 30 may be threaded/screwed together until the sleeve 80 covers, at least in a radial direction, a shoulder 34 of the first member 30.

Relative to other designs, embodiments of the present disclosure may include lower costs, less weight, less insertion depth, fewer components/pieces, and/or an improved visual indication/assurance of a connection.

Figure 9:
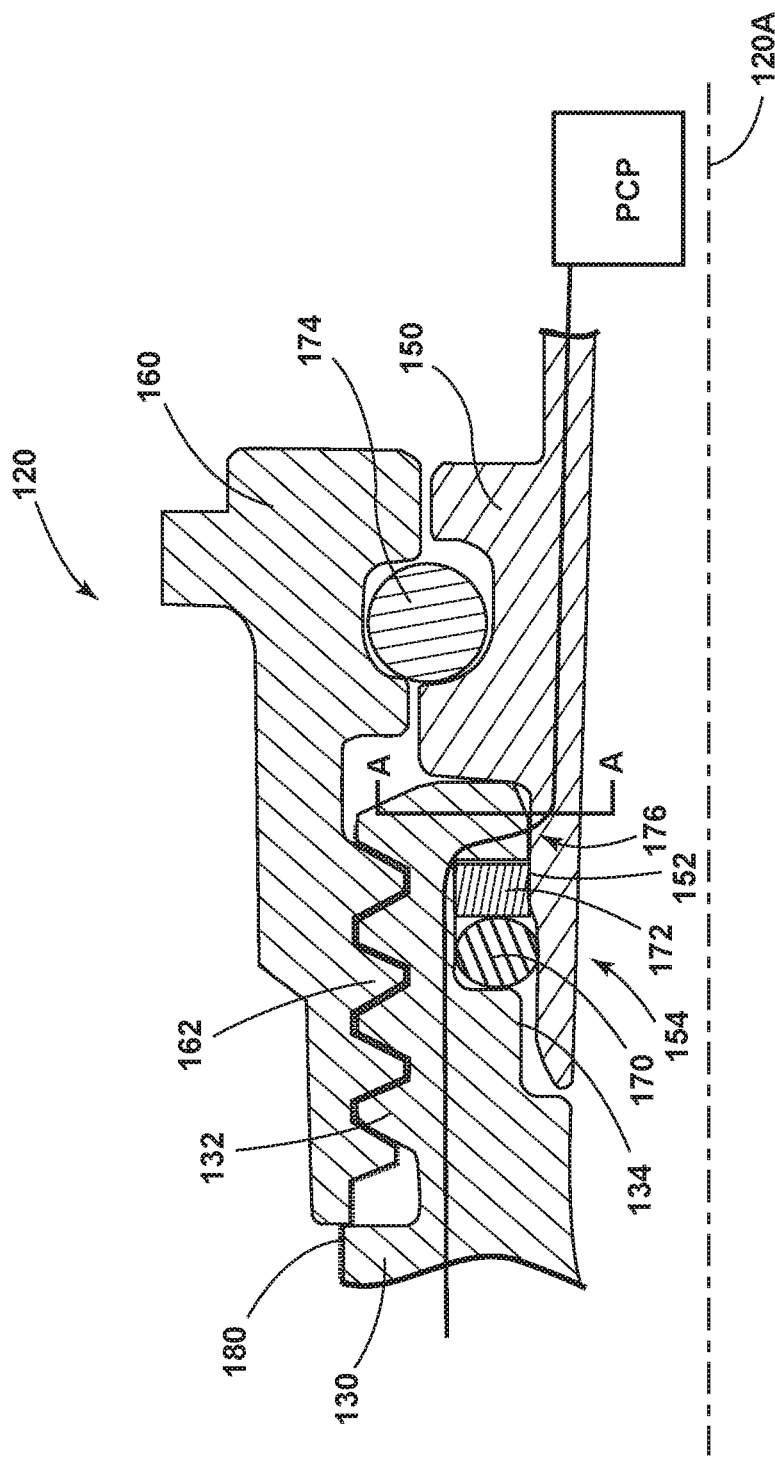
FIG. 9 is a side cross-sectional view generally illustrating an embodiment of a coupling in accordance with teachings of the present disclosure.

In embodiments, such as generally illustrated in FIG. 9, a fluid coupling/fitting 120 may include a first member 130 (e.g., a male adapter), a second member 150 (e.g., a female adapter), and/or a nut 160. Coupling/fitting 120 may include a longitudinal axis 120A. In embodiments, the first adapter 130 may include threads 132 that may be configured to engage threading 162 associated with a nut 160. Embodiments of a fluid coupling 120 may also include, for example and without limitation, one or more seals (e.g., illustrated seal 170), a back-up ring 172, and/or a drive wire 174. In the illustrated embodiment, a primary conductive path (e.g., an electrically conductive path) is generally represented by the line designated PCP, and an area of contact 176 between the male adapter 130 and the female adapter 150 is generally designated as 176.

Since the input force associated with the connection of a hand-tightened coupling may be physically limited (e.g., a human being may be able to generate a relatively limited amount of force), with embodiments, a mechanical/structural advantage may be employed to amplify the force and/or torque associated with hand installation. Such an amplification can involve the threading 132, 162 associated with an embodiment of a coupling 120, and may further involve a wedge provided or disposed on a leading edge of at least one fitting adapter, such as of the male adapter 130 and/or the female adapter 150 (e.g., a wedge 154). While threads, including threads 132, 162, are disclosed, the coupling/assembly 120 is not limited to the inclusion of threads. Consequently, other elements/features that may, inter alia, also or alternatively provide an axial mechanical connection advantage, whether part of the assembly and/or external processes, may be employed. Moreover, if or how much mechanical advantage is involved or included with a coupling/assembly 120 may be dependent upon, and/or adjusted by, tolerances associated with a male adapter 130 and/or a female adapter 150.

In embodiments, such as generally disclosed, a female adapter 150 can radially generate sufficiently high contact force with a male adapter 130 and maintain such force while permitting axial travel. It is noted that there can be a relatively small overlap between a maximum amount of an interference force between adapters 130, 150 that can be overcome by hand, and a minimum amount of force to achieve a sufficient conductivity. Moreover, with some applications, it can be commercially cost prohibitive to design tolerances and manufacture adapters 130, 150 that maintain minimum contact interference and allow the adapters 130, 150 to be joined by hand. In some embodiments, an interference may be continuous or substantially continuous, for example, involving a plurality of contact points that are substantially continuous (e.g., may comprise a substantially continuous ring).

Figure 10:
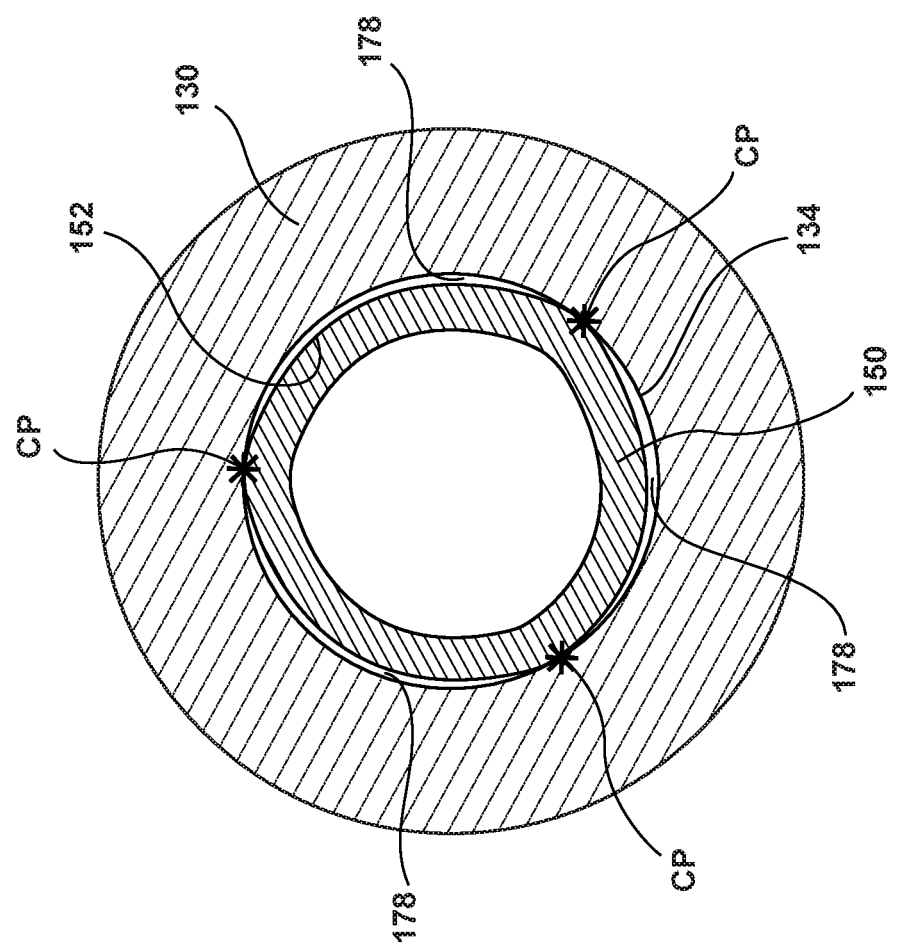
FIG. 10 is a cross-sectional view of a portion of the coupling shown in FIG. 9 viewed along A-A.
Figure 11:
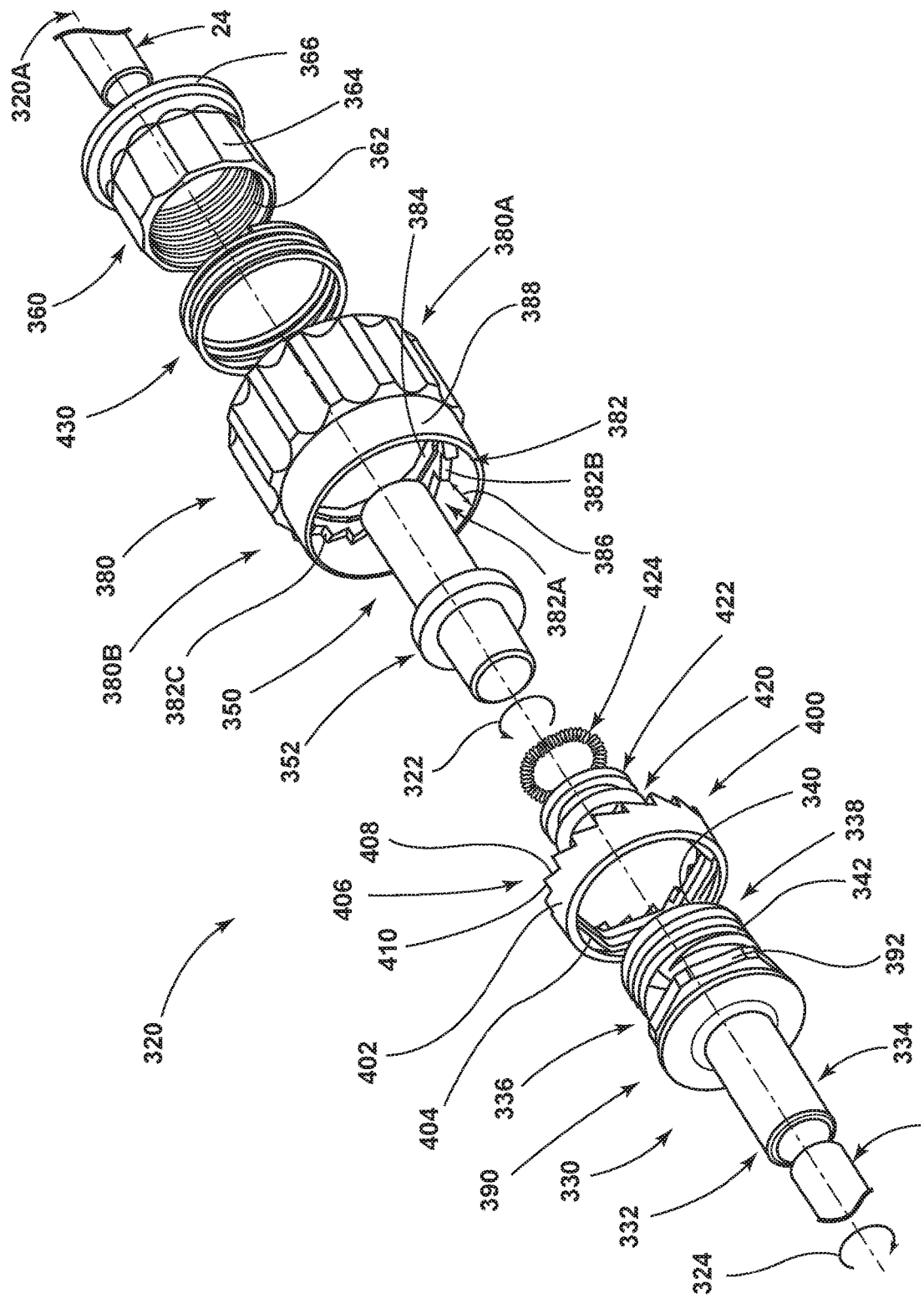
FIG. 11 is an exploded perspective view generally illustrating portions of an embodiment of a coupling, in accordance with teachings of the present disclosure.
Figure 13:
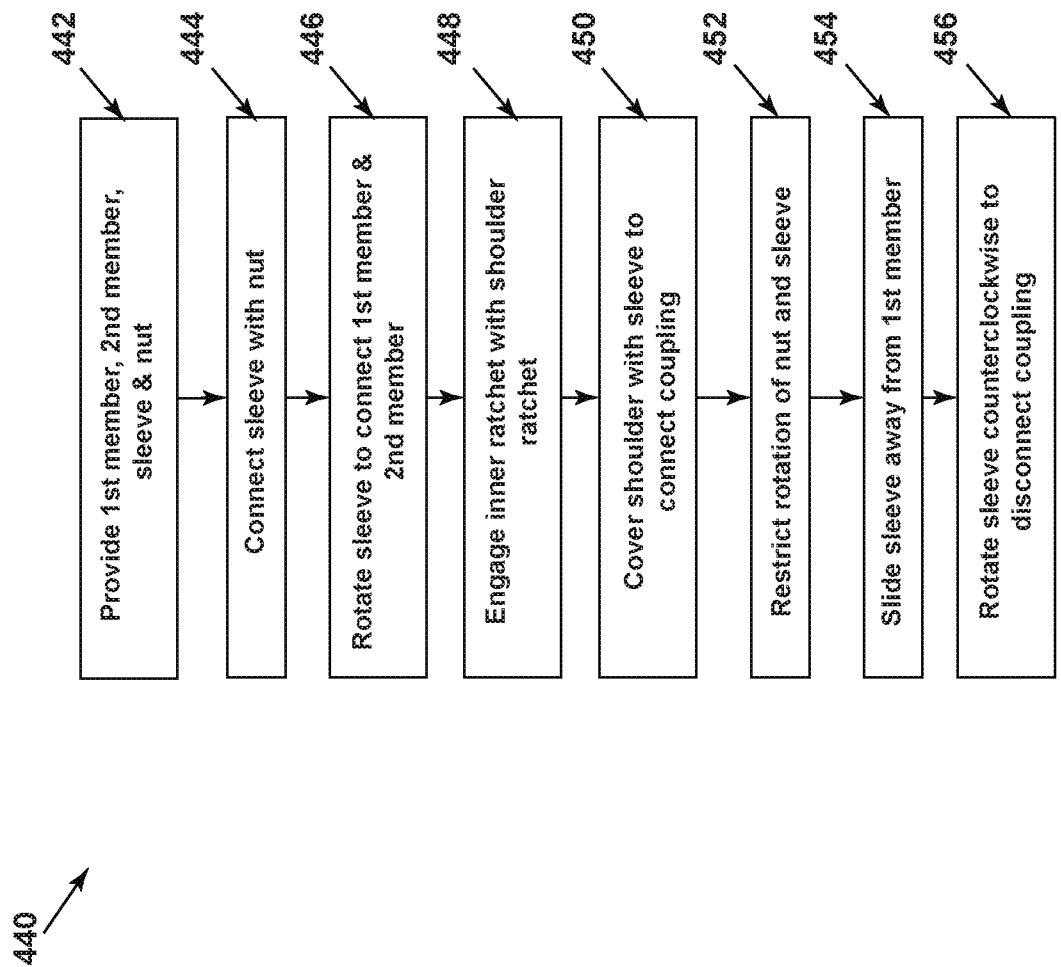
FIG. 13 is a flow diagram of an embodiment of a method of operating a coupling, in accordance with teachings of the present disclosure.

In embodiments of the disclosure, which may address such challenges, adapters 130, 150 may have clearances 178 between their average diameters, and at least one of the adapters 130, 150 may be configured to have an out-of-roundness condition that is intentionally induced in at least one of the interfacing surfaces/diameters 134, 152 (see, e.g., FIG. 10). In applications, when joined, such a configuration can create localized interferences. The localized interferences may be associated with a plurality of corresponding contact points CP, such as those disclosed further herein. Such localized interferences may, for example, reduce an overall stiffness or interference force associated with an interference fit (e.g., interference between a male adapter 130 and a female adapter 150, as generally illustrated in the depicted embodiment). For example and without limitation, localized interferences may provide areas of relatively high interference force while other areas may include clearances 178 such that a total interference/connection force is reduced. An adapter 130, 150 may be manufactured to have comparatively larger tolerances in connection with an application with a given/anticipated connection force. That is, with embodiments of the present disclosure, greater tolerances may be associated with an adapter 130, 150 while yet permitting assembly or connection with a sufficient conductive path PCP and with a comparatively lesser force (e.g., hand tightening). It is noted that for some applications/embodiments, features that increase mechanical advantage, such as threading, can increase associated/allowable tolerance ranges for components, such as adapters 130, 150, even in view of a comparatively reduced connection/assembly force. For example only and without limitation, in an embodiment of a coupling 120 involving hand tightening, a radial interference of about 0.001 inch may be involved.

Comparatively, for a similar embodiment that involves a mechanical advantage force, the associated radial interference may be increased or expanded to 0.005 inch.

An embodiment of such an out-of-roundness configuration is generally illustrated in FIG. 10. A cross-section of the male adapter 130 and the female adapter 150 are generally depicted with the female adapter 150 having a female adapter outer diameter 152 and the male adapter 130 having a male adapter inner diameter 134. In embodiments, the male adapter 130 may have a male adapter inner diameter 134 with generally tight roundness—for example and without limitation, about 0.0005 inches. With embodiments, a corresponding female adapter 150 may have an average female adapter outer diameter 152 that results in a clearance 178 with the male adapter inner diameter 134, at least in some sections. However, at least one of the female adapter 150 and the male adapter 130 may be held/formed intentionally out-of-round, which may result in a plurality of intended contact points CP between the male adapter 130 and the female adapter 150. Contact points CP may provide an electrical connection or conductivity between adapters 130, 150. With the contact points, a gap may close up as contact points translate, to a degree, radially inward. Such movement can, to some extent, serve as a spring. In embodiments, a minimum amount of contact area may be provided. However, for a number of applications, such contact area may not exceed an undesirable amount of contact stress—at least not to the degree that the part/components are unacceptably modified.

For embodiments/applications, average diameter requirements can generally be met and may be sufficiently repeatable employing known machining operations, e.g., CNC (computer numerical control) turning. Out-of-roundness may, for example and without limitation, be created or induced in the female adapter outer diameter 152 by holding the female adapter 150 in a multi jaw chuck and excess (but controlled) clamping force may be applied while turning the female adapter outer diameter 152. The introduction of an intentional out-of-roundness in connection with the female adapter 150 may, to a degree, turn the female adapter 150 into a form of spring. In embodiments, the roundness of the female adapter outer diameter 152 may have its roundness kept within the elastic range of the material.

The embodiment illustrated in FIGS. 9 and 10 discloses the inner component—e.g., the female adapter 150—formed to have a female adapter outer diameter/surface 152 that is intentionally out-of-round. However, in embodiments, the outer component—e.g., the male adapter 130—may be formed to have a male adapter inner diameter/surface 134 that is intentionally out-of-round and/or the inner component (e.g., the female adapter 150) may be controlled within conventional roundness expectations so as to provide for the generation of localized interferences.

It is also noted that while three intentional contact points CP are included in the illustrated embodiment, the inventive concept is not limited to that number, and more or less contact points CP may be employed. In general, with a lower number of contact points CP, the coupling 120 may be the less stiff, and vice versa. In embodiments, an interference may be continuous about an outer diameter 152 of the female adapter 150 and/or about an inner diameter 134 of the male adapter 130.

Moreover, the out-of-roundness form can be manufactured via a number of methods, including but not limited to: (a) restraining the part in a multi-jaw and inducing a desired out-of-roundness by monitoring the jaw deflection or the input pressure/torque applied to the chuck, (b) using a collet with an inner diameter that has the same out-of-round form ground into it, when a roughed out component is clamped in the collet an out-of-round form is induced, (c) employing a CNC ID or OD grinder, (d) employing CNC milling, and/or (e) using a CNC lathe with cam-turning capability.

With embodiments, a coupling 120 may provide for the creation of an interference fit in an economical manner in environments that do not have an excessive amount of force to engage an interference fit (such as where hand tightening may be involved).

Additionally, to address some concerns, such as galling at an interface between male and female adapters 130, 150 during applications, a coating 180 may be utilized to, for example, increase the relative hardness while minimizing an impact to the surface resistance. For example and without limitation, in an embodiment a coating 180 may be applied on threads and/or at least a portion of the conductive interface. Such a coating 180 may, for example and without limitation, comprise titanium nitride.

With embodiments, such as generally illustrated in FIGS. 11, 12A, 12B, and 12C, a coupling 320 may include a first member 330 (e.g., a male adapter), a second member 350 (e.g., a female adapter), a nut 360, and/or a sleeve 380. The first member 330 may be configured for connection with a first fluid conduit 22. The second member 350 may be configured for connection with a second fluid conduit 24. Connecting the first member 330 with the second member 350 may provide fluid communication between the first fluid conduit 22 and the second fluid conduit 24. A coupling 320 may include an axis 320A. A clockwise direction 322 and/or a counterclockwise direction 324 may be refer to rotational directions if viewed along axis 320A from the second member 350 toward the first member 330.

In embodiments, a first member 330 may include a first connection portion 332 for connecting with a first fluid conduit 22 and/or may include a second connection portion 336. The first connection portion 332 may be disposed at or about a first end 334 of the first member 330. The second connection portion 336 may be disposed at or about a second end 338 of the first member 330. The second connection portion 336 may be configured for connection with a second member 350 and/or for connection with a nut 360. For example and without limitation, second connection portion 336 may include an aperture 340 configured to receive at least a portion of the second member 350 and/or may include an outer threaded portion 342 for a threaded engagement with inner threads 362 of the nut 360.

With embodiments, a first member 330 may include a shoulder 390 that may be disposed (e.g., axially) between the first connection portion 332 and the second connection portion 336. The shoulder 390 may extend radially outward. The shoulder 390 may include a ratchet profile 400 that may correspond to an inner ratchet profile 382 of the sleeve 380. The ratchet profile 400 may be integrally formed (e.g., as a single, unitary component) with the shoulder 390 or the ratchet profile 400 may be provided by a ratchet ring 402. The ratchet ring 402 may be connected with the shoulder 390, such as, for example and without limitation, via an inner polygonal configuration/surface 404 that may correspond to an outer polygonal configuration/surface 392 of the shoulder 390. Additionally or alternatively, the ratchet ring 402 may be connected with the shoulder 390 via one or more other retaining features, such as corresponding spline profiles. In embodiments, a ratchet profile 400 of the shoulder 390 may include a plurality of teeth 406 that may include a "saw tooth"-type configuration. For example and without limitation, one or more teeth 406 may include a tapered section 408 that may be tapered in a clockwise direction (e.g., an axial extent of a tooth 406 may increase in a clockwise direction) and/or may include an axial section 410 that may be disposed substantially in parallel with an axis 320A of a coupling 320.

In embodiments, a nut 360 may be connected to the second member 350, such as via a flange 352 of the second member 350. The nut 360 may be connected to the second member 350 such that relative axial movement of the nut 360 and the second member 350 is restricted in at least one direction and/or such that relative rotational movement between the nut 360 and the second member 350 is not substantially restricted. A nut 360 may include an polygonal outer configuration/surface 364 that may correspond to an polygonal inner configuration/surface 384 of the sleeve 380. A nut 360 may include a flange 366 that may extend radially outward.

With embodiments, a sleeve 380 may be connected with and/or engaged with a nut 360. For example and without limitation, the sleeve 380, at or about a rear end 380A of the sleeve 380, may include an inner polygonal configuration/surface 384 that may correspond to an outer polygonal configuration/surface 364 of the nut 360. Engagement between the sleeve 380 and the nut 360 may restrict relative rotational movement between the sleeve 380 and the nut 360 and/or may not substantially restrict relative axial movement between the sleeve 380 and the nut 360 (e.g., a sleeve 380 may slide along a nut 360, at least to some degree).

In embodiments, a sleeve 380 may include an inner ratchet profile 382 at or about a front end 380B of the sleeve 380. An inner ratchet profile 382 may include a plurality of teeth 382A that may include a sawtooth-type configuration that may correspond to a sawtooth-type configuration of the teeth 406 of the ratchet profile 400 of the shoulder 390. The teeth 382A may include tapered sections 382B and/or axial sections 382C. A ratchet profile 382 may be axially offset by an offset distance 386 from a front end 380B of the sleeve 380. An offset distance 386 may correspond to an axial length 394 of a shoulder 390 of the first member 330 and/or to an expected tolerance stack up. For example and without limitation, the offset distance 386 may be sufficiently large such that, in an assembled/connected configuration, the sleeve 380 covers the shoulder 390 and/or extends beyond (e.g., axially) the shoulder 390. A portion of the sleeve 380 that extends beyond the inner ratchet profile 382 may be referred to as an extended section 388. In embodiments, in an assembled configuration, the sleeve 380 may extend to cover the shoulder 390 and/or beyond the shoulder 390, but the inner ratchet profile 382 may or may not be fully engaged with the ratchet profile 400 of the shoulder 390 (e.g., there may be a gap between at least some corresponding portions of the ratchet profile 400 and the inner ratchet profile 382). In embodiments, a coupling 320 may include an overlapping section 412 in which some or all of the first member 330, the second member 350, the nut 360, the sleeve 380, and the ratchet ring 402 overlap with each other in a radial direction.

With embodiments, the shoulder 390 of the first member 330 and/or the sleeve 380 may include visual indicators or provide visual indication(s). For example and without limitation, outer radial surfaces of the shoulder 390 and the sleeve 380 may have different colors or portions with different colors (e.g., two different colors). In an unconnected/disassembled configuration, both of the sleeve 380 and the shoulder 390 may be visible, such as from a radial direction (see, e.g., FIG. 12A). As the first member 330 and the second member 350 are connected, the sleeve 380 may start to cover the shoulder 390 (see, e.g., FIG. 12B). Once a coupling 320 is sufficiently connected, the sleeve 380 may cover all of the shoulder 390 such that the color of the shoulder 390 cannot be seen, at least if viewed from a radial direction (see, e.g., FIG. 12C). Full coverage of the shoulder 390 may function as a visual indicator to a user that a connection of the coupling 320 is sufficient or complete. The sleeve 380 may cover the ratchet profile 400 of the shoulder 390 such that engagement of the ratchet profile 400 with the inner ratchet profile 382 of the sleeve 380 may not function as a visual indicator.

With embodiments, a method 440 of operating a coupling 320 may include providing a first member 330, a second member 350, a nut 360, and/or a sleeve 380 (step 442). The sleeve 380 may be connected with the nut 360 such that rotation of the sleeve 380 causes rotation of the nut 360 (step 444). The sleeve 380 may be rotated to rotate the nut 360 to screw the nut 360 onto the first member 330 and/or to connect the first member 330 with the second member 350 (step 446). Connecting the first member 330 with the second member 350 may include inserting the second member 350 into a sealing ring 420, a back-up ring 422, a biasing member 424, and/or an aperture 340 of the first member 330. The biasing member 424 may be configured to provide and/or improve an electrical connection between the first member 330 and the second member 350. For example and without limitation, a biasing member 424 may be utilized in addition to and/or instead of an interference fit between the first member 330 and the second member 350. A biasing member 424 may be disposed in contact with an inner surface of the first member 330 and an outer surface of the second member 350. The biasing member 424 may include a circumferentially coiled configuration in which coils may be aligned with a circumferential direction. Rotation of the sleeve 380 may cause an inner ratchet profile 382 of the sleeve 380 to engage a ratchet profile 400 of a shoulder 390 of the first member 330 (step 448). Rotation of the sleeve 380 may continue until the sleeve 380 sufficiently covers the shoulder 390, including the ratchet profile 400, of the first member 330 (step 450).

In embodiments, a method 440 of operating a coupling 320 may include restricting rotation of the sleeve 380 and the nut 360 in a direction (e.g., in a counterclockwise direction) via the ratchet profile 400 and the inner ratchet profile 382 (step 452). For example and without limitation, rotation of the sleeve 380 (e.g., in a counterclockwise direction) may be restricted via engagement between axial sections 410 of the ratchet profile 400 of the shoulder 390 and axial sections 382C of the teeth 382A of the inner ratchet profile 382 of the sleeve 380. A spring 430 may be disposed or connected between the sleeve 380 and a flange 366 of the nut 360 and may bias the inner ratchet profile 382 into engagement with the ratchet profile 400 of the shoulder 390. Disconnecting the first member 330 from the second member 350 may include translating or sliding the sleeve 380 axially away from the first member 330 to disengage the inner ratchet profile 382 from the ratchet profile 400 (step 454). Translating or sliding the sleeve 380 axially away from the first member 330 may include or necessitate overcoming a biasing force associated with a spring 430 that may be disposed or connected between the sleeve 380 and a flange 366 of the nut 360. Once the inner ratchet profile 382 is disengaged from the ratchet profile 400 of the shoulder 390, the sleeve 380 may be rotated (e.g., counterclockwise) to unscrew the nut 360 from the first member 330, which may disconnect the first member 330 and the second member 350 (step 456).

Figure 14:
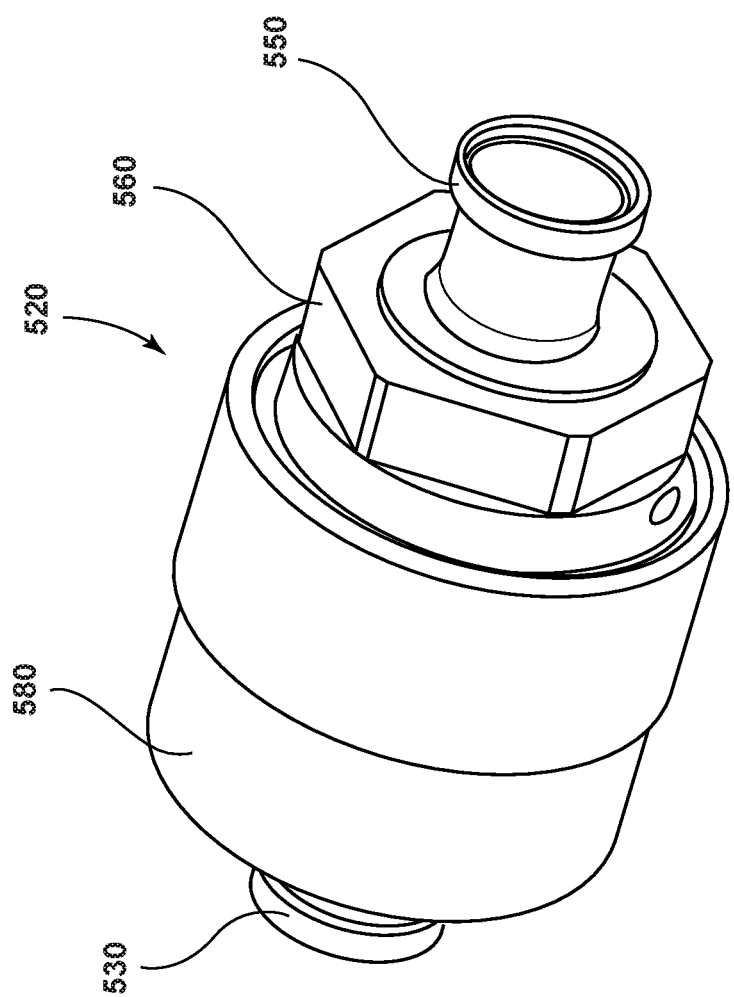
FIG. 14 is a perspective view generally illustrating an embodiment of a coupling, in accordance with teachings of the present disclosure.
Figure 15:
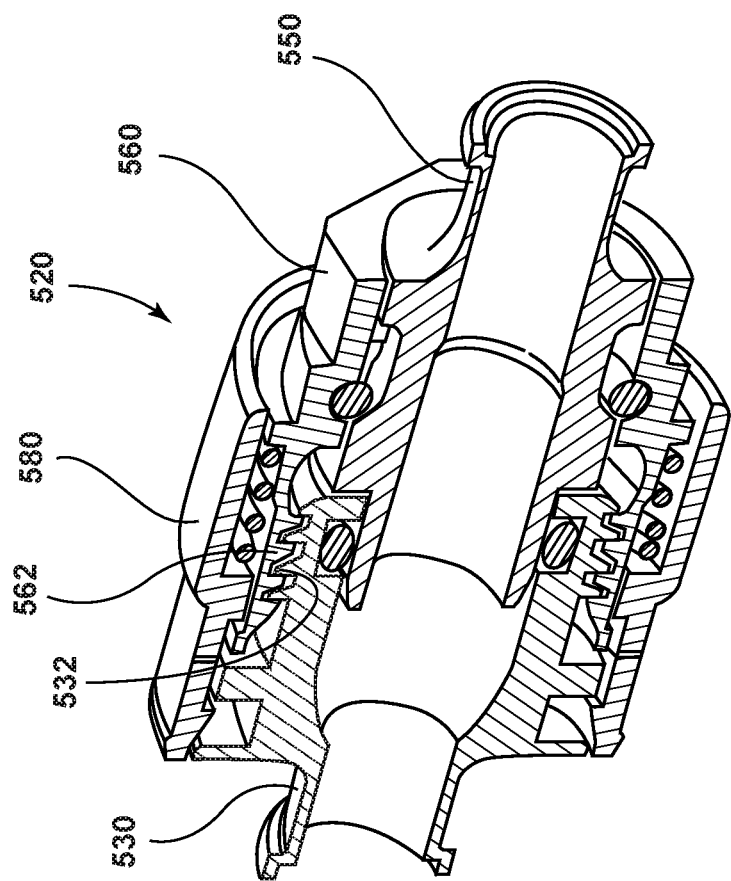
FIG. 15 is a sectional perspective view of an embodiment of a coupling as generally illustrated in FIG. 14.

An embodiment of a fitting or coupling system 520 according to aspects and teachings of the present disclosure is generally illustrated in FIGS. 14 and 15. With reference to the illustrated embodiment, a fitting system (or "fitting" or "fitting assembly" or "coupling") 520 may include a first member 530 (e.g., a male adapter), a second member 550 (e.g., a female adapter), and/or a nut 560. In an embodiment, the male adapter 530 may include threads 532 that may be configured to engage threading 562 associated with a nut 560. Embodiments of a system 520 may also include, for example and without limitation, one or more seals, a back-up ring, and/or a drive wire.

Since the input force associated with the connection of a hand-tightened fitting may be physically limited, with embodiments, a mechanical/structural advantage may be employed to amplify the force and/or torque associated with installation. Such an amplification can involve the threading associated with an embodiment of a fitting 520 (e.g., threads 532, threading 562), and may further involve the use of a tool, such as a wrench or wrenches, to provide a mechanical advantage that may include torque and/or counter-torque.

Figure 16:
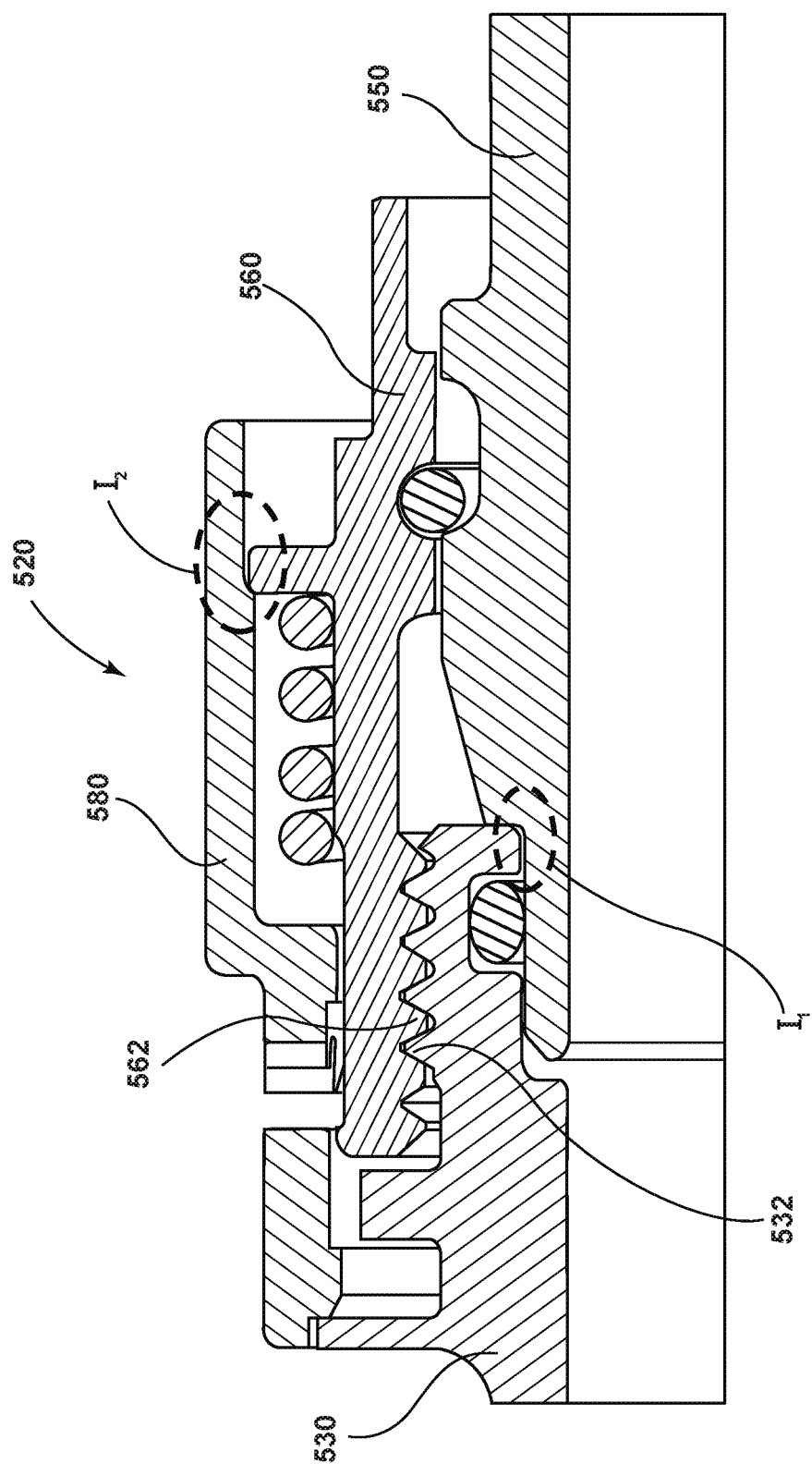
FIG. 16 is a partial cross-sectional side view of an embodiment of a coupling, generally illustrating a sleeve wedging in place and interference fits.
Figure 16A:
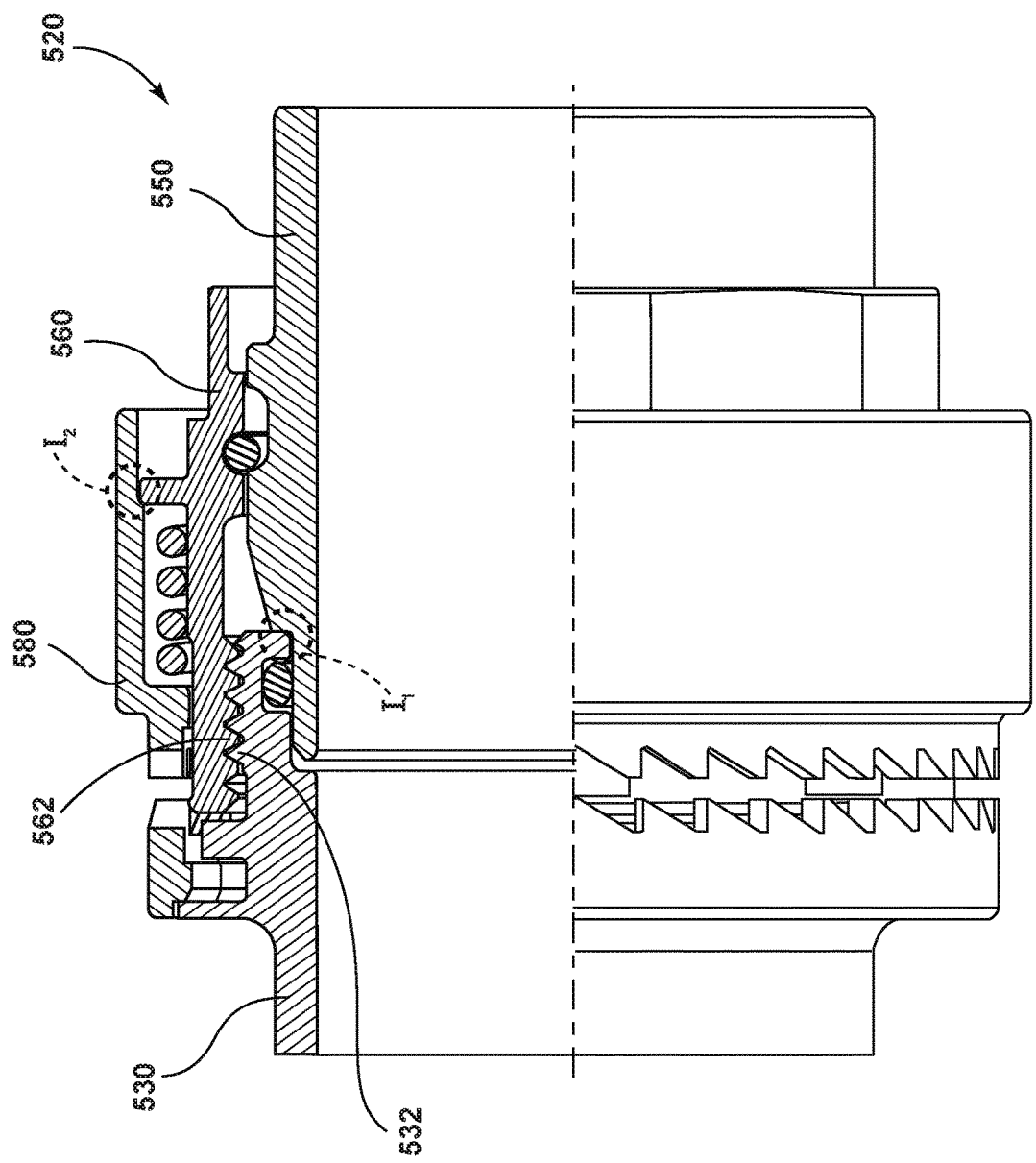
FIG. 16A is a partial cross-sectional side view of an embodiment of a coupling, such as generally illustrated in FIG. 16.

With reference to the figures, FIG. 16 generally illustrates a partial sectional view of an embodiment of a coupling 520 of the type shown in FIG. 14, and FIG. 16A generally illustrates a partial cross-sectional side view of the embodiment of a coupling 520 as generally shown in FIG. 16. As generally designated in FIG. 16A, a coupling 520 may include a male adapter 530, a female adapter 550, a nut 560, and a sleeve 580.

As generally illustrated in FIG. 16, the female adapter 550 of a coupling 520 may include a step or interference formation—i.e., exemplary interferences generally shown in the figure and designated $I_1$, $I_2$. One or more steps or interference formations (e.g., formations $I_1$, $I_2$) may be configured to create an interference or interference fit—for example, between a male adapter 530 and a female adapter 550 once the adapters are engaged or connected. As generally shown in FIG. 16, a sleeve 580 may be retracted and wedged in place in connection with an interference $I_2$. Moreover, in embodiments, an interference $I_1$ may provide sufficient contact forces between male and female adapters 530, 550 to ensure sufficiently low electrical resistance values across the male and female adapters 530, 550. To the extent that increased surface contact stress increases associated insertion forces, a wrench (e.g., standard wrench) may be utilized to assist with installation to overcome an interference fit $I_1$, $I_2$ between the components.

Figure 18:
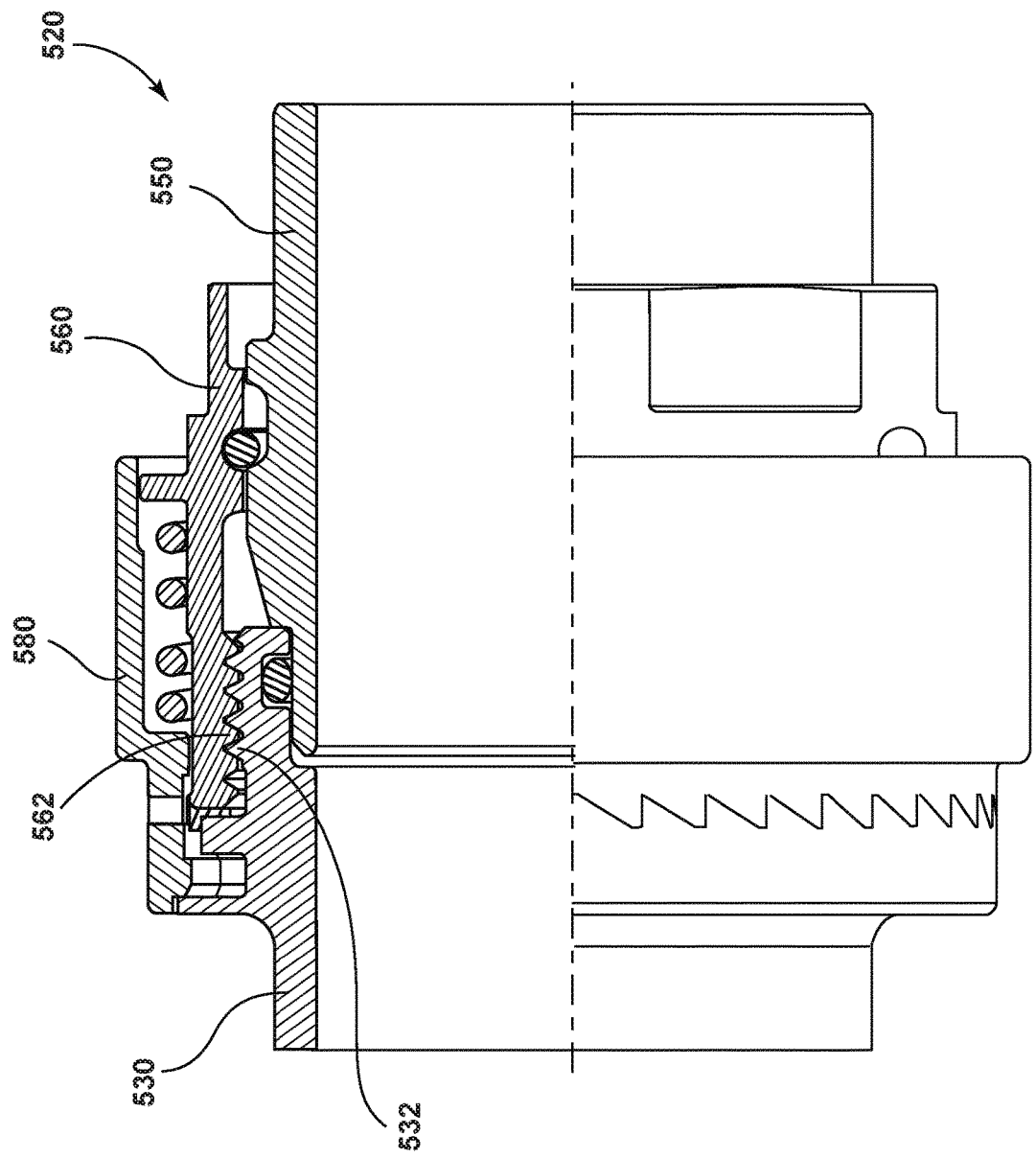
FIG. 18 is a partial cross-sectional side view of an embodiment of a coupling generally shown in a connected configuration.

FIGS. 17 and 18 generally illustrate an embodiment of a coupling 520 shown in a disconnected configuration and a connected configuration, respectively.

In embodiments of a fitting assembly 520, a sleeve 580 may be retracted or pulled back to gain access for disconnection of the male and female adapters/components 530, 550. For example and without limitation, a spanner and/or wrench (e.g., torque wrench) may be employed to disconnect the coupling components. If a component of the fitting assembly 520 starts rotating, there may be a need for a third hand to restrain or stabilize components to perform disconnection. In embodiments, a sleeve 580 may comprise one or more of a variety of shapes, sizes, configurations, and materials. For example and without limitation, a sleeve 580 may include a generally cylindrical shape and/or may be configured to slide over at least a portion of a male adapter 530, a female adapter 550, and/or a nut 560.

To help address the foregoing, including the stabilization of components for disconnection, in embodiments, an interference fit $I_2$ may be provided between a sleeve and a nut when the sleeve is in a retracted or "pulled back" position (see, e.g., FIG. 16). The interference fit $I_2$ may be configured to be sufficient to retain or hold the sleeve 580 in view of a spring force (for example and without limitation, about 4 lb-6 lb of force). In an embodiment involving such an interference $I_2$ associated with a sleeve 580, a user can first disengage or disconnect the sleeve 580, utilize the interference $I_2$ associated with the sleeve 580 to maintain (at least temporarily) a retracted position of the sleeve 580, and then can use a tool (e.g., a spanner) to disconnect the male and female adapters 530, 550 of the fitting assembly 520.

In another embodiment, the length (e.g., hex length) on a nut 560 and a sleeve 580 may be configured so that the sleeve 580 can be sufficiently retracted or pulled back to disengage from the nut 560, and the sleeve 580 may be rotated (at least partially) and/or otherwise engaged with a formation $I_2$ to keep or retain the sleeve 580 in a retracted or pulled-back configuration.

With embodiments of couplings 520, the male and female adapters 530, 550 may have specified clearances between their average diameters, and the adapters 530, 550 may or may not involve an out-of-roundness condition.

Additionally, if desired, a coating may be employed with portions of the fitting assembly 520. For example, and without limitation, a surface hardening coating (e.g., a titanium nitride) may be applied at or about portions of a coupling 520 (e.g., an interference location $I_1$, $I_2$, threads 532, 562, conductive interfaces, etc.). Moreover, embodiments of a fitting assembly 520 may or may not include a backup ring.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non- limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended claims.

What is claimed:

1. A fluid coupling, comprising:
    a first member configured for connection with a first fluid conduit, the first member including a shoulder;
    a second member configured for connection with a second fluid conduit;
    a nut; and
    a sleeve engaged with the nut and configured to cover the shoulder upon a connection of the first member with the second member;
    wherein the sleeve includes an inner ratchet profile corresponding to a ratchet profile of the shoulder in an axial direction.

2. The fluid coupling of claim 1, wherein the sleeve includes an extended section that extends axially beyond and circumferentially around the inner ratchet profile such that the inner ratchet profile is at least partially disposed within the extended section.

3. The fluid coupling of claim 1, wherein the ratchet profile of the shoulder is tapered to restrict unintended disconnection.

4. The fluid coupling of claim 1, wherein the sleeve and the shoulder are two different colors.

5. The fluid coupling of claim 1, wherein in an assembled configuration, the ratchet profile of the shoulder is covered by the sleeve and not visible from a radial direction.

6. The fluid coupling of claim 1, wherein the shoulder includes a ratchet ring that includes the ratchet profile.

7. The fluid coupling of claim 1, wherein the inner ratchet profile is axially offset by an offset distance from a front end of the sleeve.

8. The fluid coupling of claim 7, wherein the offset distance corresponds to at least one of an axial length of the shoulder and tolerance stack up.

9. The fluid coupling of claim 1, wherein the sleeve includes a polygonal inner surface corresponding to a polygonal outer surface of the nut.

10. The fluid coupling of claim 1, wherein the sleeve is connected with the nut such that the sleeve is configured to translate axially relative to the nut and such that rotational movement of the sleeve relative to the nut is restricted.

11. The fluid coupling of claim 1, wherein the fluid coupling includes an overlapping section in which all of the sleeve, the nut, the first member, and the second member overlap with each other in a radial direction.

12. The fluid coupling of claim 1, wherein the first member includes an external thread and the nut includes an internal thread corresponding to the external thread of the first member.

13. The fluid coupling of claim 1, wherein the shoulder includes a visual indicator at an outer radial surface of the shoulder.

14. The fluid coupling of claim 1, wherein, in an assembled configuration, the sleeve extends axially beyond the shoulder.

15. The fluid coupling of claim 1, including a spring biasing the sleeve toward engagement with the shoulder.

* * * * *